C. P. STRITE.
DRIVING MECHANISM FOR PRINTING PRESSES.
APPLICATION FILED APR. 1, 1914.
1,171,554.
Patented Feb. 15, 1916.
2 SHEETS—SHEET 2.
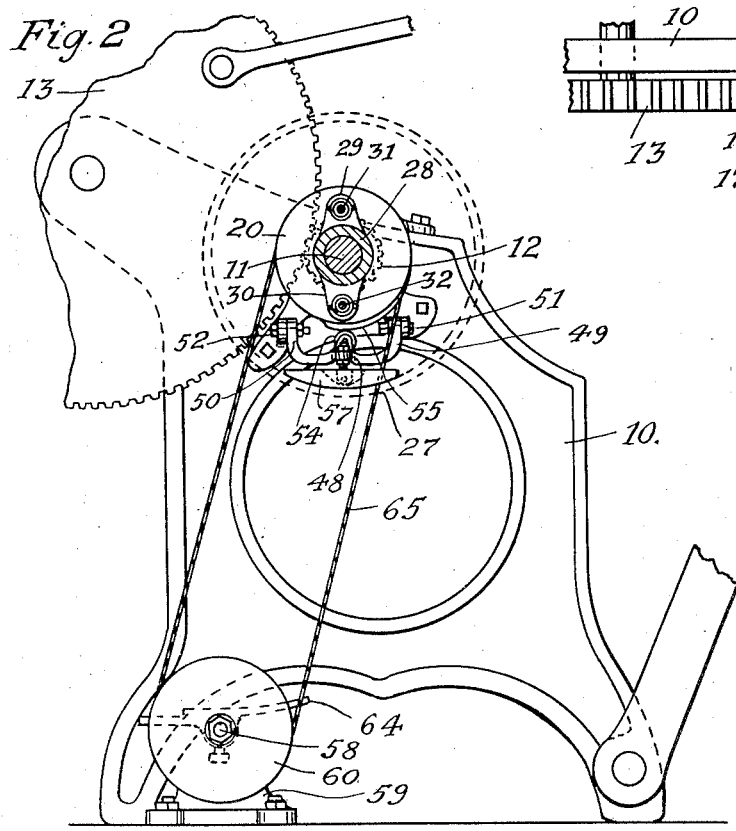
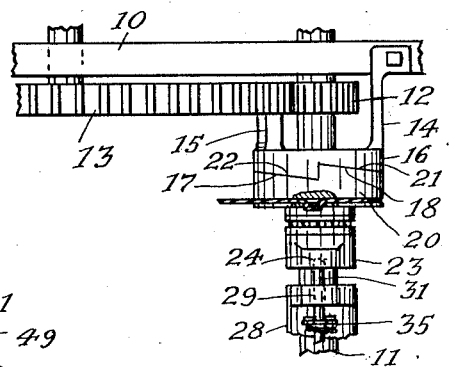
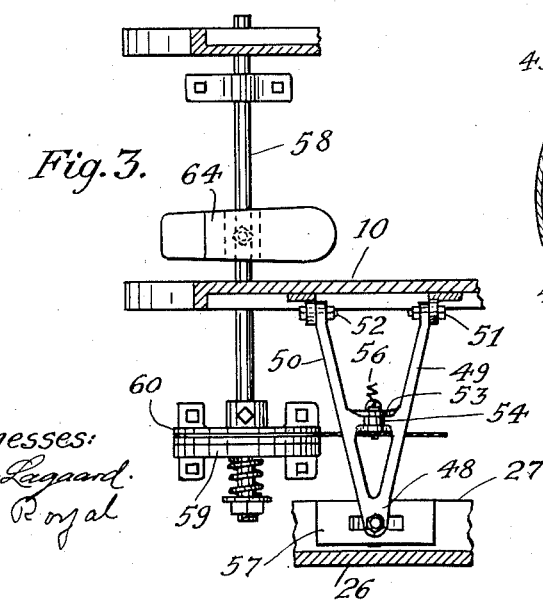
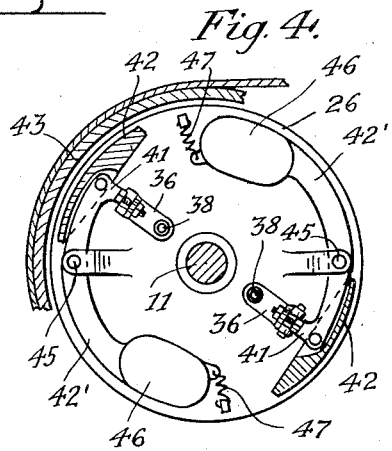
Witnesses:
Theo Lagaard.
A. M. Royal
Inventor
Charles P. Strite.
By H. A. Whiteley
his Attorney.

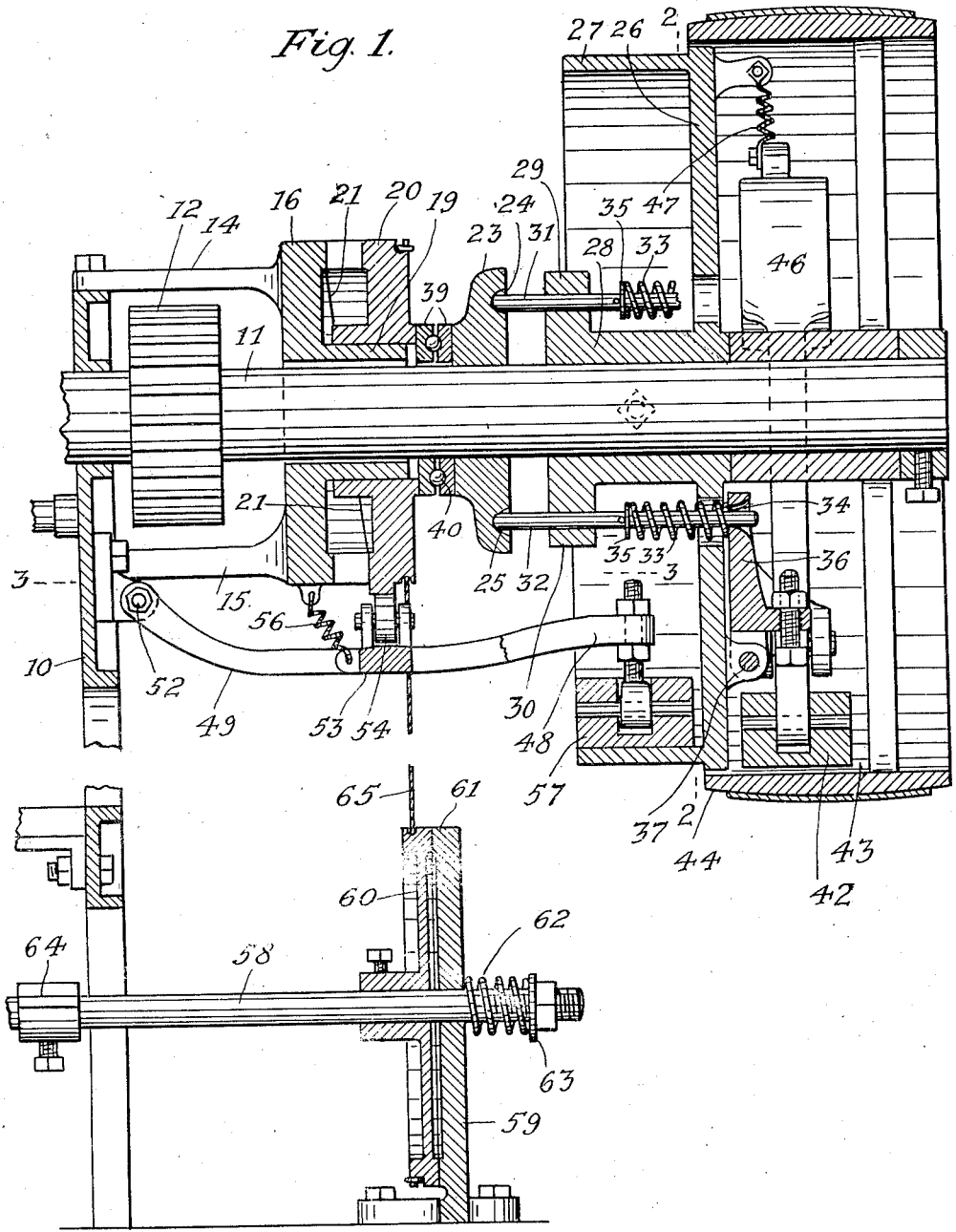

UNITED STATES PATENT OFFICE.

CHARLES P. STRITE, OF MINNEAPOLIS, MINNESOTA, ASSIGNOR, BY MESNE ASSIGNMENTS, TO HORTON MANUFACTURING COMPANY, OF MINNEAPOLIS, MINNESOTA, A CORPORATION.

DRIVING MECHANISM FOR PRINTING-PRESSES.

1,171,554.   Specification of Letters Patent.   Patented Feb. 15, 1916.

Application filed April 1, 1914. Serial No. 828,738.

*To all whom it may concern:*

Be it known that I, CHARLES P. STRITE, a citizen of the United States, residing at Minneapolis, in the county of Hennepin and State of Minnesota, have invented certain new and useful Improvements in Driving Mechanism for Printing-Presses, of which the following is a specification.

My invention relates to driving mechanism for printing-presses and has for its object to provide a combined governor pulley and brake foot controlled and operative to regulate the speed at which the printing-press is driven and instantly to stop and brake the same when desired.

The full objects and advantages of my invention will appear in connection with the detailed description thereof and are particularly pointed out in the claims.

In the drawings, illustrating the application of my invention in one form, Figure 1 is a vertical sectional view of my improved governor pulley and brake. Fig. 2 is a section on line 2—2 of Fig. 1 on a reduced scale. Fig. 3 is a sectional plan view on line 3—3 of Fig. 1 on a reduced scale. Figs. 4 and 5 are enlarged detail views of features of the machine.

As illustrated, the frame 10 of a job printing-press has journaled therein a drive shaft 11, which, through pinion 12, operates the main driving gear 13 of the printing-press in a well-known manner. By means of arms 14 and 15 bridging the pinion 12, I rigidly secure to the frame 10 a collar 16 provided with angularly-disposed cam faces 17, 18. The cam 16 has thereon a sleeve hub 19 upon which is journaled to turn freely a second collar or pulley 20 provided with engaging faces 21, 22 complementally positioned in reference to faces 17 and 18 on collar 16, so that when the collar 20 is rotated upon the sleeve 19 the said complemental engaging faces will have the effect of moving the cam bodily along shaft 11. Slidable on shaft 11 is a ring or collar 23 having socketed extensions 24, 25. A disk 26, having a flange 27 thereon, is fast on shaft 11, and the hub 28 thereof is provided with extensions 29, 30 through which project pins 31, 32, which are caused to engage in sockets 24 and 25 by means of springs 33 between washers 34 and 35 on the pins. The washers 34 are fixed in position on the pins 31 and 32, while the washers 35 are slidable on said pins and engage arms 36 of crank levers pivoted at 37 to the disk 26, pins 31 and 32 projecting through apertures 38 in said arms 36. The action of the springs 33, through pins 31, 32 and collar 23 and an intervening set of collars 39 providing seats for ball bearings 40, forces the cam disk 20 against stationary cam disk 16. The levers 36 have arms 41 adjustably connected with shoes 42 curved to fit within the rim 43 of belt pulley 44 loose on shaft 11. Each of shoes 42 is carried on an arm 42' pivoted at 45 to the disk 26, and is provided with a weighted arm 46 which is also pulled outwardly by springs 47. Under ordinary conditions the springs 47 hold the shoes 42 out of engagement with pulley disk 43, so that the belt pulley runs free on shaft 11 and does not operate to rotate the shaft. If, however, the cam disk 20 is turned, it will have the effect of forcing pins 31 and 32 inwardly so as to cause the collars 35 to be forced by springs 33 against crank arms 36, which will tend to rock such arms upon the pivots 37 and force the shoes 42 into engagement with the pulley disk 43. The friction of said shoes with the inside of the pulley rim will cause the disk 26, and shaft 11 with which it is connected, to rotate with pulley 44. As the speed of the pulley increases, centrifugal force will tend to cause the weights 46 to move outwardly and thereby overcome the pressure of springs 33 and withdraw shoes 42 from engagement with the inside of rim 43, so that pulley 44 will slip over those shoes and not rotate disk 26 and shaft 11. By this means the speed of shaft 11 is governed. With this construction it is practicable to gradually apply pressure to springs 33 so as to accelerate the machine slowly until the desired speed is attained. This is a matter of peculiarly high advantage in the operation of a job printing-press, where it is always desirable to run slowly at the start until the work has been tested and is certainly running satisfactorily, when the speed may be sufficiently accelerated. It is also a matter of great importance to stop the printing-press instantly when required. My improved pulley construction makes it practicable to stop the press with the same action which renders the driving pulley inoperative. To this end I provide a brake-carrying member 48, preferably having two arms 49 and 50 pivotally connected with the frame 10 at 51 and 52, as best shown in Figs. 2 and 3. A crossbar 53 has a roller 54 journaled in a pair of lugs thereon, and roller 54 is held in engagement with a cam 55 on the outer face of collar 20 by means of a spring 56 with crossbar 53 and the fixed cam disk 16. Pivotally and adjustably carried by member 48 is a brake shoe 57 engaging the inside of flange 27 on disk 26. The cam 55 is so positioned upon cam member 20 that when said member is in normal position so that pulley 44 is inoperative, the cam 55 will, through roller 54 and member 48, have forced brake shoe 57 into engagement with rim 27 so as to hold the disk 26 stationary. When, however, the cam member 20 is rotated to render pulley 44 operative, such rotation will move cam 55 so as to permit spring 56 to withdraw brake shoe 57 from operative engagement with rim 27.

To operate the disk 20, I journal a shaft 58 in the frame 10 and a fixed friction disk stand 59, as shown in Figs. 1 and 3. Fast on shaft 58 is a grooved pulley 60, which also has a friction face. This friction face is caused to engage the friction face 61 of disk standard 59 by means of a spring 62 on shaft 58, which engages the outside of stand 59 and a collar 63 fast on shaft 58, thereby drawing the disk 60 into frictional engagement with the face 61. The shaft 58 and grooved pulley 60 are therefore held in any position to which they may be turned by means of the frictional engagement between disks 60 and 61. A double extended treadle 64 is fast on shaft 58 outside of frame member 10, through which, by use of the foot, the operator may turn shaft 58 in either direction. The disk 60 on shaft 58 is connected with cam disk 20 by means of a cable 65, so that rotation of disk 60 will correspondingly rotate disk 20. By these means the pulley 44 may be rendered operative to the desired extent and the brake 57 correspondingly released, and conversely the pulley 44 may instantly be rendered inoperative and the brake 57 simultaneously applied to terminate driving action and stop the press at the will of the operator.

I claim:

1. In combination with the drive shaft of a printing press, a power-operated pulley loose on said shaft, a brake drum fast on the shaft, means associated with said brake drum for operatively connecting the brake drum with the pulley to drive the shaft, said means comprising devices movable with the brake drum and movable relatively thereto for engagement with a portion of the pulley whereby a governing control of the drive shaft is effected, a brake coöperating with said brake drum, and means under the control of the operator for simultaneously applying the brake and releasing said connecting means, or vice versa.

2. In a printing-press a main driving shaft, a power-operated pulley loose on said shaft, a driving disk fast on the shaft, a braking device pivotally connected with a stationary member, means normally holding said brake in engagement with a portion of the disk to hold said disk and shaft stationary, a spring tending to swing said member upon its pivot to withdraw the braking action, and means for operatively connecting the driving disk and the pulley so that the pulley may exercise a governing control over the driving disk, actuation of said connecting means operating to withdraw the brake-holding means and permit operation of the spring.

3. In a printing-press, a main driving shaft, a power-operated pulley loose on said shaft, a driving disk fast on the shaft having a laterally-extended annular arm, an arm pivotally connected with a stationary member having a brake shoe positioned to engage with said rim, means engaging said arm to hold said brake in engagement with the rim when the pulley and disk are disconnected, a spring tending to swing said arm upon its pivot to withdraw the brake, and means for operatively connecting the driving disk and the pulley, actuation of said connecting means operating to withdraw the brake-holding means and permit operation of the spring.

4. In a printing-press, a main driving shaft, a power-operated pulley loose on said shaft, a driving disk fast on the shaft, a pivoted brake member adapted to engage a portion of said driving disk to hold the disk and shaft stationary, means for operatively connecting the driving disk and the pulley so that the pulley may exercise a governing control over the driving disk, and a rotary member under the control of the operator for simultaneously withdrawing the brake and actuating said connecting means.

5. In a printing-press, a main driving shaft, a power-operated pulley loose on said shaft, a driving disk fast on the shaft, a pivoted brake member adapted to engage a portion of said driving disk to hold the disk and shaft stationary, means for operatively connecting the driving disk and the pulley so that the pulley may exercise a governing control over the driving disk, a rotary member under the control of the operator for simultaneously withdrawing the brake and actuating said connecting means, and means for holding said rotary member wherever set.

6. In a printing-press, a main driving shaft, a power-operated pulley loose on said shaft, a driving disk fast on the shaft, a pivoted brake member adapted to engage a portion of said driving disk to hold the disk and shaft stationary, means for operatively connecting the driving disk and the pulley so that the pulley may exercise a governing control over the driving disk, a rotary member under the control of the operator for simultaneously withdrawing the brake and actuating said connecting means, foot-controlled means for operating the rotary member, and means for holding said rotary member wherever set.

7. In a printing-press, a main driving shaft, a power-operated pulley loose on said shaft, a driving disk fast on the shaft, a pivoted brake member adapted to engage a portion of said driving disk to hold the disk and shaft stationary, a rotary cam engageable with said brake member to hold the same operative, foot-controlled means for rotating the cam member to permit withdrawal of the brake device, and means operated by rotation of the cam member for operatively connecting the driving disk and the pulley so that the pulley may exercise a governing control over the driving disk.

8. In a printing-press, a main driving shaft, means normally disconnected therefrom to operate the drive shaft, a pivoted brake member, a rotary member having means thereon for simultaneously rendering said driving means operative and controlling the brake member, a counter-shaft having a double foot pedal secured thereto for rotating said shaft in either direction, a pulley disk on said shaft, a belt connecting said pulley disk and rotary member, a stationary friction member, and means for holding the pulley disk in contact with the friction member whereby the rotary member is held wherever set.

9. In a printing press, a main driving shaft, a power-operated pulley loose on said shaft, a driving member fast on the shaft having a laterally-extended annular rim, an arm pivotally connected with a stationary member having a brake shoe positioned to engage with said rim, a rotary member having a cam engaging said arm to hold said brake in engagement with the rim when the pulley and disk are disconnected, a spring tending to swing said arm upon its pivot to withdraw the brake, and means controlled by said rotary member for operatively connecting the driving disk and the pulley, actuation of said rotary member operating to withdraw the cam and permit operation of the spring.

10. In a printing-press, a main driving shaft, a fixed ring surrounding said shaft and having a cam face, a rotary member surrounding the shaft and having a cam face spring-pressed in engagement with the cam face of the fixed member, driving means for the shaft, braking means for the shaft, means controlled by rotation of said rotary member for simultaneously rendering said driving means operative and said brake inoperative, and vice versa, and means under the control of the operator for rotating the rotary member.

In testimony whereof I affix my signature in presence of two witnesses.

CHARLES P. STRITE.

Witnesses:
A. J. STRITE,
F. A. WHITELEY.